US012584453B2

(12) United States Patent
Meske

(10) Patent No.: US 12,584,453 B2
(45) Date of Patent: Mar. 24, 2026

(54) STEEL PISTON FOR AN INTERNAL COMBUSTION ENGINE

(71) Applicant: FEDERAL-MOGUL NURNBERG GMBH, Nuremberg (DE)

(72) Inventor: Ralf Meske, Schwabach (DE)

(73) Assignee: FEDERAL-MOGUL NURNBERG GMBH, Nuremberg (DE)

(*) Notice: Subject to any disclaimer, the term of this patent is extended or adjusted under 35 U.S.C. 154(b) by 0 days.

(21) Appl. No.: 18/578,509

(22) PCT Filed: Jul. 6, 2022

(86) PCT No.: PCT/EP2022/068725

§ 371 (c)(1),
(2) Date: Jan. 11, 2024

(87) PCT Pub. No.: WO2023/285233

PCT Pub. Date: Jan. 19, 2023

(65) Prior Publication Data

US 2024/0318610 A1 Sep. 26, 2024

(30) Foreign Application Priority Data

Jul. 13, 2021 (DE) ..................... 10 2021 207 405.7

(51) Int. Cl.
*F02F 3/22* (2006.01)
*F02F 3/00* (2006.01)

(52) U.S. Cl.
CPC ........ *F02F 3/22* (2013.01); *F02F 2003/0061* (2013.01)

(58) Field of Classification Search
CPC ............................ F02F 3/22; F02F 2003/0061
See application file for complete search history.

(56) References Cited

U.S. PATENT DOCUMENTS

| | | | | |
|---|---|---|---|---|
| 3,291,497 A * | 12/1966 | Cross | F16J 9/20 277/455 |
| 5,113,817 A * | 5/1992 | Kemnitz | F02F 3/0069 92/216 |
| 6,547,251 B1 * | 4/2003 | Hitosugi | F16J 9/062 277/455 |
| 6,682,078 B2 * | 1/2004 | Hitosugi | F16J 9/203 277/455 |
| 10,197,161 B2 * | 2/2019 | Friede | B23B 27/06 |
| 2003/0051694 A1 * | 3/2003 | Gaiser | F02B 23/0672 123/193.6 |
| 2008/0041333 A1 | 2/2008 | Jarrett et al. | |

(Continued)

FOREIGN PATENT DOCUMENTS

| | | |
|---|---|---|
| DE | 2734519 A1 | 2/1978 |
| DE | 3928491 A1 | 3/1991 |

(Continued)

*Primary Examiner* — Kurt Philip Liethen
(74) *Attorney, Agent, or Firm* — Dickinson Wright PLLC

(57) ABSTRACT

A steel piston (10) for an internal combustion engine includes a cooling cavity (20) extending in a rotationally symmetrical manner about the piston axis and at least three annular grooves (12, 14, 16), wherein the third annular groove (16), as viewed from the piston crown (18), has a greater depth (T3) than the depth (T2) of a second annular groove (14).

17 Claims, 3 Drawing Sheets

(56) References Cited

U.S. PATENT DOCUMENTS

| | | | | |
|---|---|---|---|---|
| 2008/0121102 | A1 * | 5/2008 | Scharp | F02F 3/0023<br>92/186 |
| 2017/0284334 | A1 | 10/2017 | Lineton et al. | |
| 2018/0119635 | A1 * | 5/2018 | Wandrie, III | F02F 3/26 |

FOREIGN PATENT DOCUMENTS

| | | | | |
|---|---|---|---|---|
| DE | 19616474 | A1 | 8/1997 | |
| DE | 19716702 | C2 | 5/2000 | |
| DE | 102007044106 | A1 | 3/2009 | |
| DE | 102008055909 | A1 | 5/2010 | |
| DE | 102009032941 | A1 | 1/2011 | |
| DE | 102012204770 | A1 | 9/2013 | |
| EP | 0366983 | B1 | 6/1993 | |
| EP | 1061249 | A2 | 6/2000 | |
| EP | 1264980 | A2 * | 12/2002 | F16J 9/00 |
| JP | S58-72654 | A | 4/1983 | |
| JP | H0893550 | A | 4/1996 | |
| WO | 20190048190 | A1 | 8/2018 | |
| WO | 20180213370 | A1 | 11/2018 | |

* cited by examiner

STEEL PISTON FOR AN INTERNAL COMBUSTION ENGINE

BACKGROUND

1. Technical Field

The invention relates to a steel piston for an internal combustion engine, which comprises a cooling cavity extending in a rotationally symmetrical manner about the piston axis and at least three annular grooves.

2. Related Art

Such steel pistons are known in the prior art and comprise annular grooves that are usually configured solely to accommodate the piston rings. Due to the thermal load on such a piston during engine operation, i.e. particularly high temperatures at the piston crown with simultaneous cooling of the cooling channel, thermal deformations occur which substantially curve the piston crown upward and bend the ring zone outward. Owing to the bending of the ring zone, in particular the second annular groove is bent together, i.e. the groove flanks come closer to one another at the end thereof. If a weld seam is placed in the region of the second groove as a result of friction or induction welding, the increase in stiffness due to the additional material of the weld bead leads to high stresses at the transition between the cooling channel wall and the weld bead and at the groove base radii of the second groove. These thermal stresses can lead to crack formations and piston failure under thermal alternating stress.

Until now, attempts have been made to prevent this by shifting the axial position of the weld seam along the piston stroke axis or increasing the wall thickness between the cooling channel and the ring zone. However, the former measure is not always expedient, and the latter measure disadvantageously increases the weight.

DE 197 16 702 C2, which shows a cooling channel located at the level of the first annular groove, and DE 27 34 519 A1 and EP 0 366 983 B1, which do not show a cooling channel, constitute further prior art. It should be noted that none of the cited documents relates to a steel piston.

SUMMARY

Against this background, a steel piston is provided having improved resistance to thermomechanical stress in the region of the weld bead and the second groove without increasing the weight.

According thereto, a third annular groove, as viewed from the piston crown, has a greater depth than a second annular groove, and/or a minimum wall thickness between the third annular groove and a cooling cavity extending in a rotationally symmetrical manner about the piston axis is at least locally smaller than a minimum wall thickness between the second annular groove and the cooling cavity. Both measures substantially lead to the third annular groove acting as a bending joint, so to speak, and absorbing a higher proportion of the thermally induced deformation of the ring zone. This relieves the second annular groove, in the region of which a weld seam, and in particular in the case of friction welding the associated weld bead, is typically present. However, it is also conceivable to join piston parts by means of resistance welding or laser welding. The reduced wall thickness can in particular be provided by a local increase in the cross-section of the cooling cavity, for example by means of a turned groove provided there.

In other words, the third annular groove, which until now has only been dimensioned to accommodate an oil ring and therefore typically has a shallower depth than the second annular groove, is deepened in a novel manner and/or the wall thickness to a cooling cavity is locally reduced, which improves the response of the piston to thermal loads. In particular, the stresses in the region of the weld bead and the second annular groove can be reduced, and at the same time the stresses in the region of the third annular groove can be kept within manageable limits.

In particular, as a result of the measure according to the invention, a reduction in stress in the region of the second annular groove of up to 16% could be determined in simulations.

Advantageous embodiments of the steel piston according to the invention are described.

As mentioned, the improved steel piston particularly exhibits its advantages if there is a weld bead or weld seam between the first and third annular grooves, so that there is an additional concentration of stress in this region that can be relieved by the bending about the groove base of the third annular groove, which is accepted according to the invention.

Owing to the deepening of the third annular groove, the bending of this groove increases in an intended manner, which, however, leads to higher stresses in the groove base radii of the third groove. This increase in stress can be compensated by increasing the radii. It is currently in particular preferred that at least one groove base radius of the third annular groove is larger than at least one groove base radius of the second annular groove.

The effects of the last-described measures can be used particularly extensively if the third annular groove has a groove base radius at both the lower flank and the upper flank, each of which is larger than the respective groove base radius of the second annular groove.

Stresses can be limited in a similar manner if the third annular groove has a groove base radius that is elliptical in cross-section or composed of two radii.

In particular, the groove base of the groove may as a whole consist of an elliptical curve that tangentially transitions into lower and upper flanks.

Good results are furthermore achieved with a groove base of the third annular groove that consists of a tangentially continuous transition of at least two radii at the lower flank, a straight section and at least two radii at the upper flank. In mathematical terms, a basket arch is, in other words, described in cross-section.

Furthermore, the two groove base radii of the third groove can each be replaced by a convex cubic spline curve and a curvature-continuous transition to the groove flanks.

Such a steel piston also makes it possible, due to the increased depth of the third annular groove, to dispense with oil drainage holes that are otherwise usually provided in the region of the third annular groove. In particular, oil can be stored in the deeper groove on the downstroke, which can be used again on the upstroke to lubricate the piston skirt.

Finally, in order to particularly ensure the effect according to the invention, it is preferred that the third annular groove has a depth at least 5% greater than the second annular groove. In general, it should be added with regard to described depths and depth ratios that the depth is determined based on the distance between the piston outer wall (imagined in the region of the respective groove) and the deepest point of the groove.

THE DRAWINGS

In the following, the invention will be explained in more detail in reference to embodiments shown in the drawing in which:

FIG. 1 is a cross-sectional view of an upper part of a piston.

FIG. 2*a* is an enlarged cross-sectional view of one side of a piston according to a first embodiment.

FIG. 2*b* is an enlarged cross-sectional view of first, second and third annular grooves of the piston of the first embodiment.

DETAILED DESCRIPTION

Figure 1:
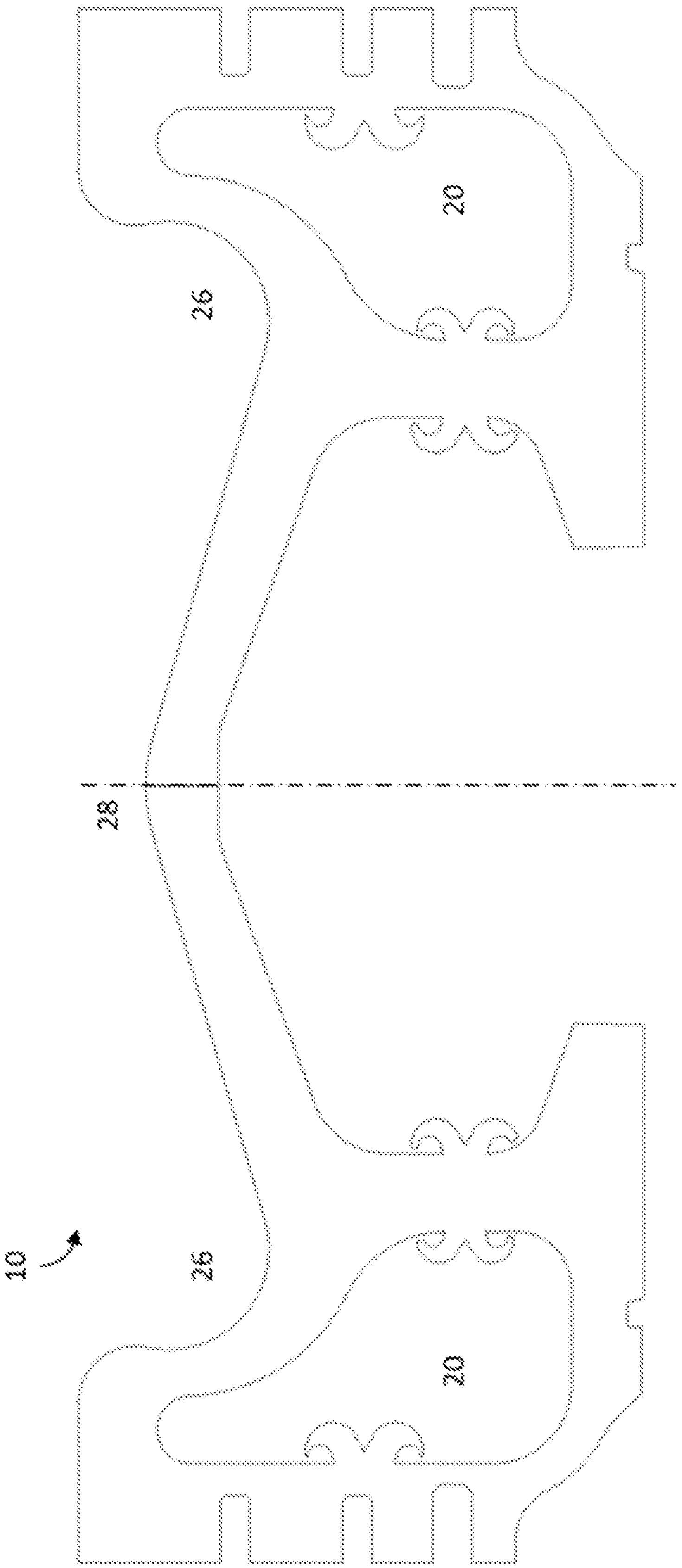

A steel piston 10 comprises a piston crown 28 with a combustion chamber bowl 26 and a cooling cavity extending in a rotationally symmetrical manner about the piston axis, which is configured as an annular cooling channel 20. Three annular grooves 12, 14, 16 are formed in the region of a ring zone, as viewed from the piston crown. As is apparent in particular in FIG. 2*b*, the third annular groove 16 has a greater depth T3 than a depth T2 of the second annular groove 14.

Figure 4:
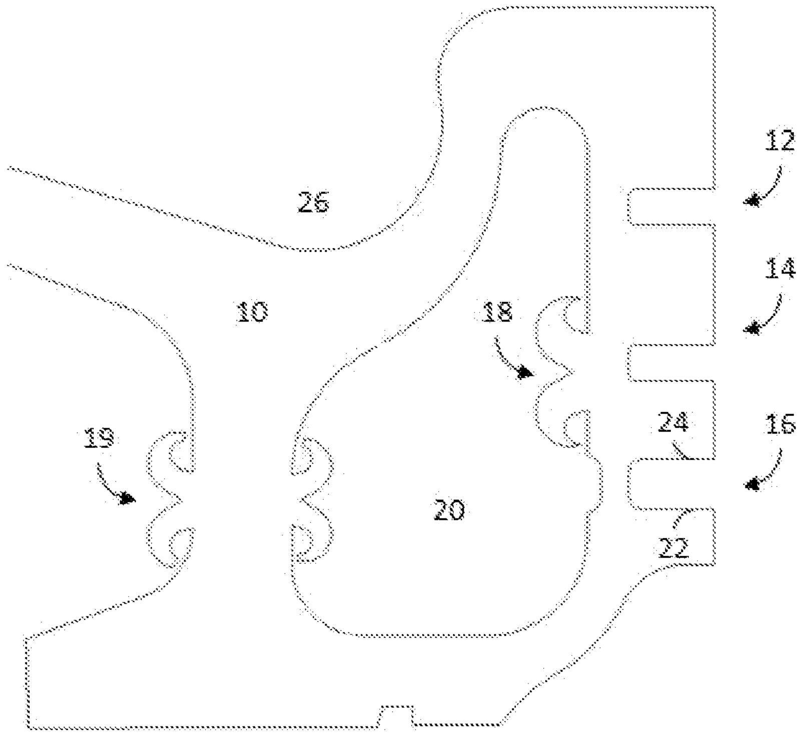
FIG. 4 is an enlarged cross-sectional view of one side of a piston according to a third embodiment.

Furthermore, the wall thickness D3 between the third annular groove 16 and the cooling channel 20 is less than the wall thickness D2 between the second annular groove 14 and the cooling channel 20. In contrast to the other figures, FIG. 4 shows an embodiment with a local increase in the cross-section of the cooling channel 20, which further reduces the wall thickness D3 between the third annular groove 16 and the cooling channel 20.

Figure 2A:
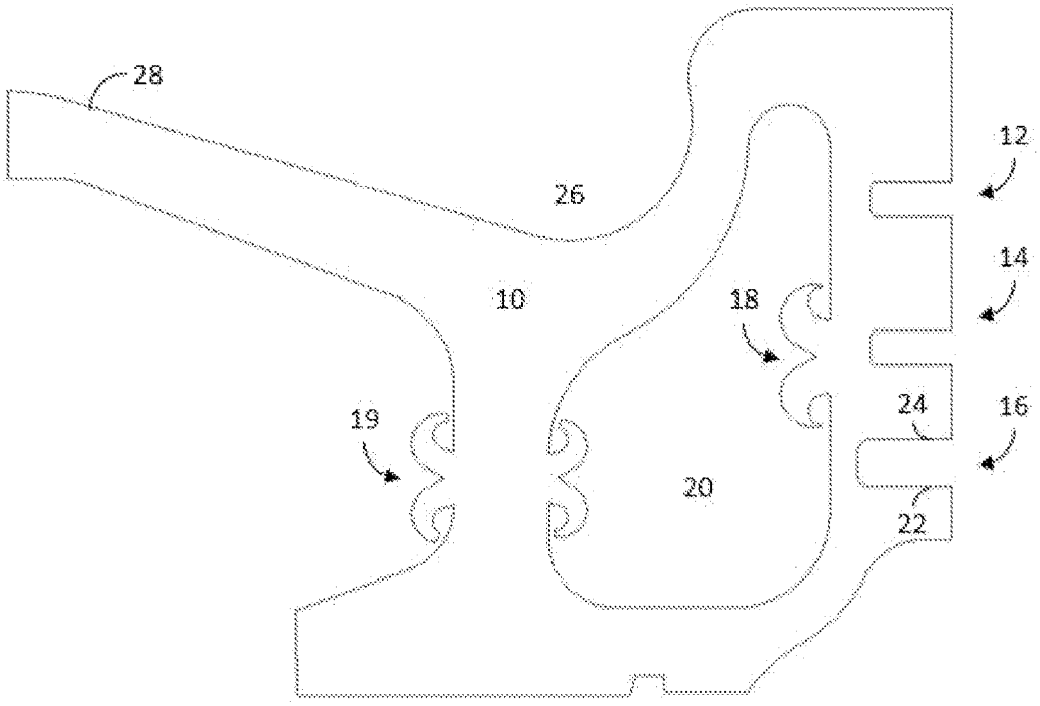
Figure 2B:
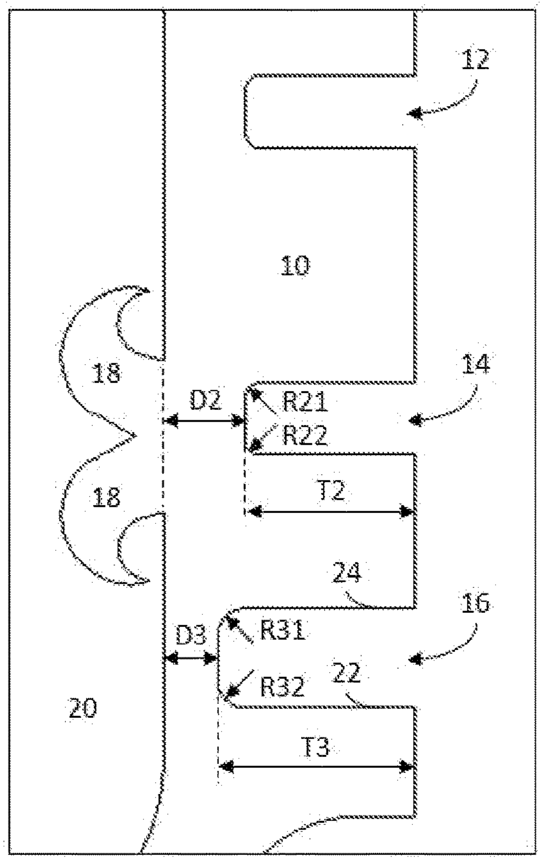
Figure 3:
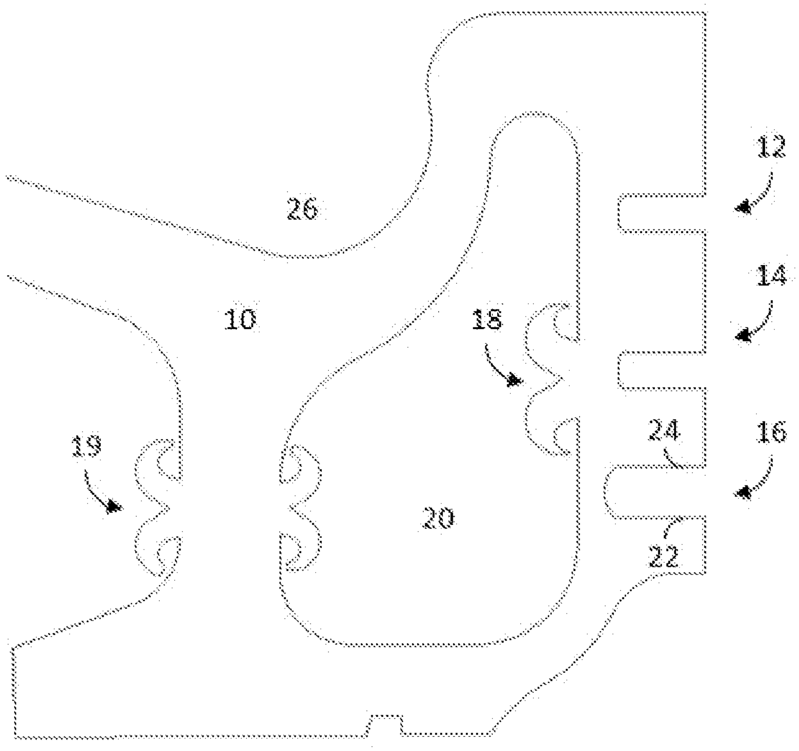
FIG. 3 is an enlarged cross-sectional view of one side of a piston according to a second embodiment.

In the embodiment according to FIGS. 1 and 2, the groove base radii R31, R32 of the third annular groove 16 are larger than the groove base radii R21, R22 of the second annular groove 14. However, it is also possible that only the upper groove base radius R31 of the third annular groove 16 is larger than the upper groove base radius R21 of the second annular groove 14, or that the lower groove base radius R32 of the third annular groove 16 is larger than the lower groove base radius R22 of the second annular groove 14. Alternatively, as shown in FIGS. 3 and 4, the third annular groove 16 may also be configured with a groove base in the shape of an elliptical curve that transitions tangentially into the lower flank 22 and the upper flank 24.

In addition, an outer weld bead 18 is apparent in the figures, which leads to a stiffening of the material in the shown position in the region of the second annular groove 14, the stress on which can be reduced in an advantageous manner also in the event of thermal deformation by the design of the third annular groove 16 according to the invention. There is furthermore an inner weld bead 19. It should be understood that the outer weld bead 18 shown in the figures does not have to be arranged in the center of the second annular groove 14.

What is claimed is:

1. A steel piston for an internal combustion engine comprising a cooling cavity extending in a rotationally symmetrical manner about the piston axis, the piston including a first annular groove, a second annular groove, a third annular groove, and no more than three annular grooves between a crown of the piston and a skirt of the piston, wherein the third annular groove, as viewed from the piston crown, has a greater depth than a depth of the first annular groove and a depth of the second annular groove, and wherein a welding bead or welding seam is present between the first annular groove and the third annular groove.

2. The steel piston according to claim 1, wherein the third annular groove does not comprise oil drainage holes.

3. The steel piston according to claim 1, wherein the depth of the third annular groove is at least 5% greater than the depth of the second annular groove.

4. The steel piston according to claim 1, wherein the depth of the first annular groove is equal to the depth of the second annular groove.

5. A steel piston for an internal combustion engine comprising a cooling cavity extending in a rotationally symmetrical manner about the piston axis and at least a first annular groove, a second annular groove, and a third annular groove, wherein the cooling cavity extends longitudinally along an entirety of a length of each of the annular grooves, wherein a minimum wall thickness between the third annular groove and the cooling cavity is smaller than a minimum wall thickness between the second annular groove and the cooling cavity and smaller than a minimum wall thickness between the first annular groove and the cooling cavity due to a local increase in the cross-section of the cooling cavity adjacent the third annular groove, and wherein each minimum wall thickness extends perpendicular to the piston axis from the respective annular groove to the cooling gallery, wherein a welding bead or weld seam is present between the first annular groove and the third annular groove.

6. The steel piston according to claim 5, wherein the third annular groove, as viewed from the piston crown, has a greater depth than a depth of the second annular groove, the third annular groove has at least one groove base radius that is larger than a largest groove base radius of the second annular groove, and the third annular groove does not comprise an oil drainage hole.

7. The steel piston according to claim 6, wherein the third annular groove base radius is at each of a lower flank and an upper flank of the third annular groove and which are each larger than the groove base radii of the second annular groove.

8. The steel piston claim 7, wherein the third annular groove has at least one groove base radius that is elliptical in cross-section or composed of two radii.

9. The steel piston according to claim 8, wherein the cross-section of the groove base of the third annular groove consists of an elliptical curve that tangentially transitions into the lower flank and the upper flank.

10. The steel piston according to claim 7, wherein the groove base of the third annular groove consists of a tangentially continuous transition of at least two radii at the lower flank, a straight section and at least two radii at the upper flank.

11. The steel piston according to claim 7, wherein the groove bottom of the third annular groove consists of a curvature-continuous transition of a convex cubic spline curve at the lower flank, a straight section and a convex cubic spline curve at the upper flank.

12. The steel piston according to claim 6, wherein a welding bead or weld seam is present between the first annular groove and the third annular groove.

13. The steel piston according to claim 1, wherein the third annular groove has groove base radii at each of a lower flank and an upper flank which are each larger than a largest groove base radius of the second annular groove, the third annular groove does not comprise oil drainage holes, and the depth of the third annular groove is at least 5% greater than the depth of the second annular groove.

14. The steel piston claim 13, wherein at least one groove base radius of the third annular groove is elliptical in cross-section or composed of two radii.

15. The steel piston according to claim 14, wherein the cross-section of the groove base of the third annular groove consists of an elliptical curve that tangentially transitions into the lower flank and the upper flank.

16. The steel piston according to claim 13, wherein the groove base of the third annular groove consists of a tangentially continuous transition of at least two radii at the lower flank, a straight section and at least two radii at the upper flank.

17. The steel piston according to claim 13, wherein the groove bottom of the third annular groove consists of a curvature-continuous transition of a convex cubic spline curve at the lower flank, a straight section and a convex cubic spline curve at the upper flank.

* * * * *